US006991001B2

(12) United States Patent
Heer

(10) Patent No.: US 6,991,001 B2
(45) Date of Patent: Jan. 31, 2006

(54) COMPRESSED AIR CONTROL APPARATUS FOR COMPRESSED AIR SYSTEMS OF MOTOR VEHICLES

(75) Inventor: Siegfried Heer, Wiesloch (DE)

(73) Assignee: Haldex Brake Products GmbH, Heidelberg (DE)

( * ) Notice: Subject to any disclaimer, the term of this patent is extended or adjusted under 35 U.S.C. 154(b) by 379 days.

(21) Appl. No.: 10/434,714

(22) Filed: May 9, 2003

(65) Prior Publication Data

US 2003/0209267 A1 Nov. 13, 2003

(30) Foreign Application Priority Data

May 10, 2002 (DE) .................. 102 20 790

(51) Int. Cl.
*F16K 11/10* (2006.01)
(52) U.S. Cl. .................... 137/883; 303/118.1
(58) Field of Classification Search ............... 137/883, 137/885; 303/118.1; 34/80
See application file for complete search history.

(56) References Cited

U.S. PATENT DOCUMENTS

| | | | | |
|---|---|---|---|---|
| 3,928,711 | A | * | 12/1975 | Jakobsen .................... 137/883 |
| 5,678,900 | A | | 10/1997 | Blanz ......................... 303/6.01 |
| 5,867,918 | A | * | 2/1999 | Deike et al. ............. 303/118.1 |
| 6,041,808 | A | * | 3/2000 | Blanz .......................... 137/883 |
| 6,540,308 | B1 | | 4/2003 | Hilberer .................... 303/6.01 |
| 6,640,463 | B1 | * | 11/2003 | Beck et al. ..................... 34/80 |

FOREIGN PATENT DOCUMENTS

| | | | |
|---|---|---|---|
| DE | 195 15 895 | A1 | 10/1996 |
| DE | 195 44 621 | C1 | 1/1997 |
| DE | 44 21 575 | C2 | 7/1997 |
| DE | 196 49 498 | C1 | 2/1998 |
| DE | 197 00243 | C1 | 4/1998 |
| DE | 198 35 638 | A1 | 2/2000 |
| EP | 0 689 117 | B1 | 6/1996 |
| EP | 0 776 807 | B1 | 5/2001 |

* cited by examiner

*Primary Examiner*—John Fox
(74) *Attorney, Agent, or Firm*—Thomas, Kayden, Horstemeyer & Risley, LLP

(57) ABSTRACT

A compressed air control apparatus for compressed air systems of motor vehicles includes a pressure controller (2), an air dryer (4) and a multi circuit protection valve (3). The pressure controller (2) controls the pressure in the compressed air control apparatus. The pressure controller (2) includes an outlet valve (8). The air dryer (4) dries the compressed air flowing through the compressed air control apparatus. The multi circuit protection valve (3) supplies a plurality of circuits (I, II, III, IV, V) with compressed air. The multi circuit protection valve (3) includes a plurality of overflow valves (23), at least one solenoid valve (32) and a regeneration conduit (36). Each of the overflow valves (23) is associated with one of the circuits (I, II, III, IV, or V). The at least one solenoid valve (32) arbitrarily operates the overflow valve (23), and it controls a regeneration phase of the air dryer (4) in which water is removed from the air dryer (4). The regeneration conduit (36) connects the solenoid valve (32) to the outlet valve (8) of the pressure controller (2).

20 Claims, 5 Drawing Sheets

COMPRESSED AIR CONTROL APPARATUS FOR COMPRESSED AIR SYSTEMS OF MOTOR VEHICLES

CROSS REFERENCE TO RELATED APPLICATIONS

This application claims priority to co-pending German Patent Application No. 102 20 790.9 entitled "Druckluftaufbereitungseinrichtung für Kfz-Druckluftanlagen", filed May 10, 2002.

FIELD OF THE INVENTION

The present invention generally relates to a compressed air control apparatus for compressed air systems of motor vehicles. The compressed air control apparatus includes a pressure controller including an outlet valve, an air dryer and a multi circuit protection valve. The multi circuit protection valve includes an overflow valve for each one of the circuits, and at least one solenoid valve for operating the overflow valve. Especially, the motor vehicle is a truck.

BACKGROUND OF THE INVENTION

A compressed air control apparatus is known from German Patent No. DE 44 21 575 C2 corresponding to European Patent No. EP 0 689 117 B1. A pressure controller, an air dryer and a multi circuit protection valve are arranged in a common housing of the known compressed air control apparatus. The pressure controller includes an outlet valve. The pressure controller including the outlet valve controls the load phase and the idle phase of the apparatus. The air dryer serves to remove humidity from the compressed air being delivered by a compressor. The known multi circuit protection valve includes a plurality of overflow valves having limited backflow and a plurality of solenoid valves. Usually, each one of the overflow valves is associated with one of the circuits of the multi circuit protection valve. Each one of the solenoid valves is associated with each one of the overflow valves. The solenoid valves are designed and arranged to arbitrarily operate the overflow valves. Each solenoid valve is supplied with compressed air by a central aerating system, and it includes its own deaerating connection. In the currentless condition of the solenoid valve, the deaerating connection is closed. A separate regeneration circuit serves for regeneration of the air dryer. Another solenoid valve is arranged in the regeneration circuit. A regeneration conduit coming from the solenoid valve is arranged to bypass a check valve leading to the central aerating system. Consequently, the regeneration circuit leads in a backward direction through the air dryer to reach the outlet of the outlet valve. The solenoid valve of the regeneration circuit is designed to be closed in its currentless condition such that the regeneration conduit is connected to the atmosphere by its own deaerating connection. The check valve being located in the regeneration conduit serves to prevent continuous loss of compressed air. It is also possible to associate one common solenoid valve with the two brake circuits. The control conduit of the common solenoid valve leads to the two overflow valves of the two brake circuits. The known compressed air control apparatus requires the use of a comparatively great number of solenoid valves.

Another compressed air control apparatus for compressed air systems of motor vehicles is known from German Patent No. DE 195 44 621 C1 corresponding to European Patent No. EP 0 776 807 B1. The known compressed air control apparatus includes a pressure controller, an air dryer and a multi circuit protection valve together forming a common structural unit. Each circuit of the multi circuit protection valve is associated with an overflow valve having limited backflow. Each overflow valve includes a valve body or a so called "movable wall" separating a stream chamber from a rear chamber including a spring. The stream chamber (or the flow chamber) is connected with the rear chamber by a bypass conduit in which an electrically controllable solenoid valve having its own deaerating connection is located. The solenoid valve is designed to be closed in its currentless condition. This means that it locks the connection in the bypass conduit. On the other hand, when the solenoid valve is excited, it realizes the connection, and it locks the deaerating connection. The dryer may be regenerated in a regeneration phase. A separate solenoid valve is located in a regeneration conduit.

SUMMARY OF THE INVENTION

The present invention relates to a compressed air control apparatus for compressed air systems of motor vehicles. The compressed air control apparatus includes a pressure controller, an air dryer and a multi circuit protection valve. The pressure controller is designed and arranged to control the pressure in the compressed air control apparatus. The pressure controller includes an outlet valve. The air dryer is designed and arranged to dry the compressed air flowing through the compressed air control apparatus. The multi circuit protection valve is designed and arranged to supply a plurality of circuits with compressed air. The multi circuit protection valve includes a plurality of overflow valves, at least one solenoid valve and a regeneration conduit. Each of the overflow valves is associated with one of the circuits. The at least one solenoid valve is designed and arranged to arbitrarily operate the overflow valve and to control a regeneration phase of the air dryer in which water is removed from the air dryer. The regeneration conduit is designed and arranged to connect the solenoid valve to the outlet valve of the pressure controller.

In the novel compressed air control apparatus, the number of required solenoid valves is decreased without having to give up substantial functions of such a compressed air control apparatus. In this way, the structural expenditure is substantially decreased. It is still possible to fill separate circuits in a preferred way, to allow for air exchange occurring between the separate circuits, to control the overflow valves of the separate circuits and to regenerate the air dryer.

The present invention is based on the concept of combining the control of at least one overflow valve with the control of the regeneration phase during which water is removed from the air dryer, and to only use one single solenoid valve for these two purposes. In this way, similar control circuits are combined by one common solenoid valve, and different functions are combined by only using one common solenoid valve. These different functions are combined such that common actuation does not have a negative effect on the respective other function. In this way, a common solenoid valve may be used to control the two overflow valves of the brake circuits I and II and—at the same time—to control the regeneration phase of the air dryer. Due to the fact that a solenoid valve controlling the outlet valve of the pressure controller is required, anyway, the common solenoid valve may be advantageously used for regeneration of the air dryer during the idle phase of the compressor, meaning when the outlet valve is opened. In the load phase, it is possible to realize preferred filling of the two operational brake circuits with the same signal of the common solenoid valve without losing air. It is even possible to use only one further solenoid valve in addition to the solenoid valve being associated with the pressure controller and the outlet valve. This second solenoid valve may be designed and arranged to control all overflow valves of the respective circuits and the regeneration phase.

The solenoid valve may be designed and arranged to directly control regeneration by the regeneration conduit. Only one check valve being designed and arranged to open in the regeneration direction is located in the regeneration conduit. The solenoid valve is designed in a way that it provides the required cross section for the flow occurring in the regeneration phase. This design is also preferred for quick control of the overflow valves. In this case, only respectively small effective chambers have to be filled.

On the other hand, there is the possibility of designing the solenoid valve to indirectly control regeneration via the regeneration conduit. In this case, a relay valve is arranged in the regeneration conduit. The relay valve is designed as a 2/2 way valve. This means that the valve has two connections and two positions. In this way, it is possible to design the cross sections of the solenoid valve to be smaller. It is sufficient when the regeneration conduit has a respective cross section and when the regeneration air may stream over the relay valve.

There are a number of possibilities of designing the solenoid valve. The solenoid valve may be designed and arranged such that it is closed in its currentless condition. This means that it locks the connecting conduit between the central aerating system and the effective chamber at the effective surface of the overflow valve such that no compressed air from the central bore reaches the atmosphere. On the other hand, the effective chamber of the effective surface of the overflow valve is connected to the atmosphere in this currentless condition. These facts apply to embodiments of overflow valves in which the effective surface being controlled by the solenoid valve is located at the same (upstream) side as the two effective surfaces being located at the upstream side and being designed and arranged to determine the opening pressure of the overflow valve and the hysteresis.

On the other hand, it is also possible to use a solenoid valve being designed and arranged to be opened in its currentless condition. In the currentless condition, the deaerating opening leading to the atmosphere is locked, and there is connection in the connecting conduit between the central aerating system and the effective surface at the overflow valve. A constructive exemplary embodiment of the overflow valve in which the effective surface being impinged by the solenoid valve is located at the side of the spring chamber, meaning not at the upstream side, is associated with the aforementioned embodiment of the solenoid valve being opened in the currentless condition.

It is especially preferred when the solenoid valve is designed and arranged to control the two overflow valves of the circuits I and II of the brake and to control regeneration. Preferably, the effective surface being located at the two overflow valves being controlled by the solenoid valve is located upstream when solenoid valves being closed in their currentless condition are used. However, it is also possible that the effective surface being located at the two overflow valves being controlled by the solenoid valve is located downstream and that a relay valve is arranged in the regeneration phase. It is preferred to arrange a relay valve in the regeneration conduit to provide the required great cross sections for regeneration. In this embodiment, the common solenoid valve fulfills the functions of three solenoid valves. This concept may even be applied to all solenoid valves of the compressed air control apparatus with the exception of the solenoid valve controlling the outlet valve of the pressure controller.

When a relay valve is arranged in the regeneration conduit, the relay valve may include a piston being supported on a spring such that the relay valve is not opened before exceeding a minimum pressure being determined by the spring. The spring may be designed in a way that its force is adjustable to be capable of adjusting the minimum pressure. In this way, it is ensured that regeneration is prevented below the minimum pressure when pressure builds up in the compressed air control apparatus. There also are other cases in which it is desired to prevent regeneration below a minimum pressure in the central aerating system.

Other features and advantages of the present invention will become apparent to one with skill in the art upon examination of the following drawings and the detailed description. It is intended that all such additional features and advantages be included herein within the scope of the present invention, as defined by the claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention. In the drawings, like reference numerals designate corresponding parts throughout the several views.

DETAILED DESCRIPTION

Figure 1:
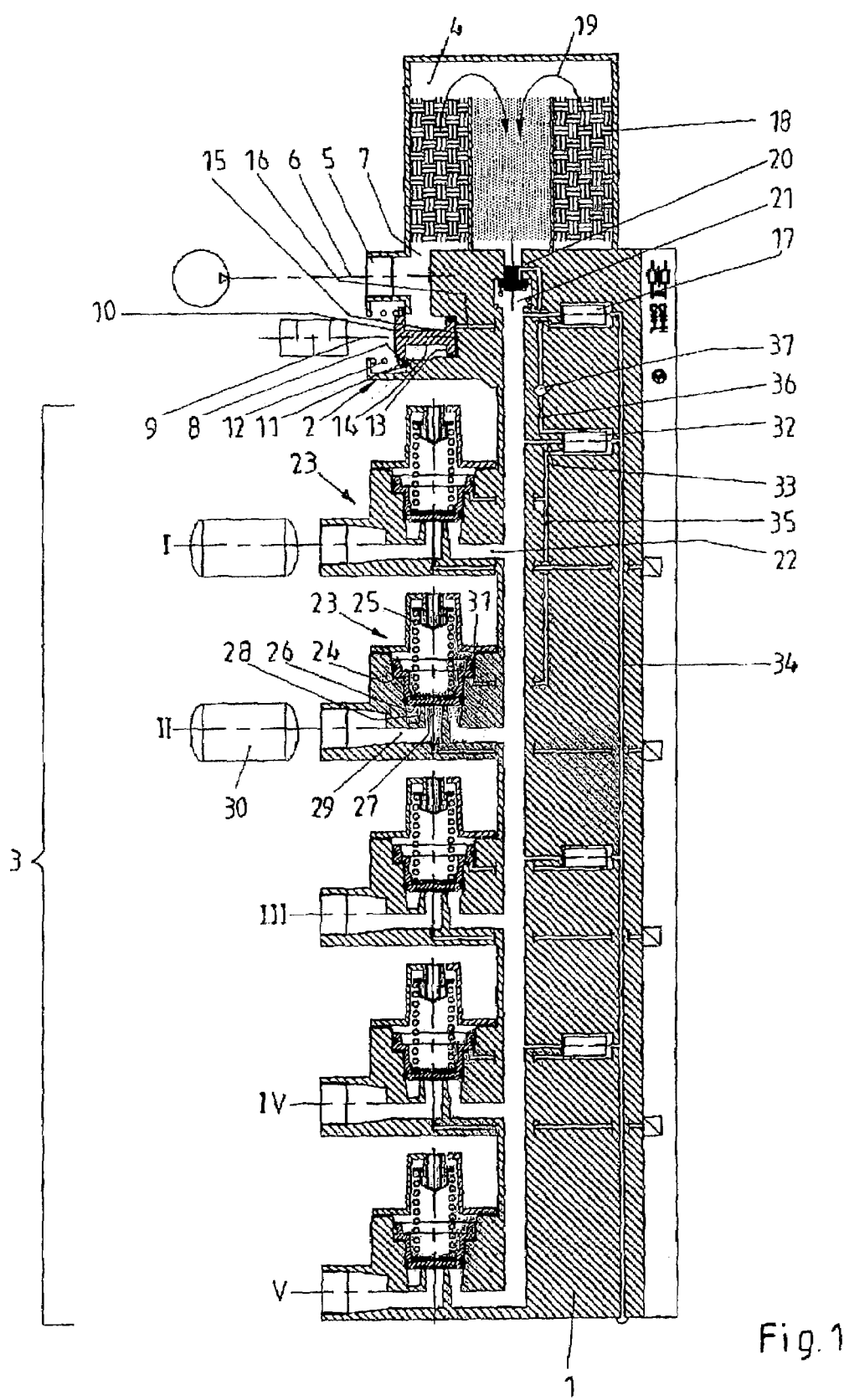
FIG. 1 is a schematic sectional view of a first exemplary embodiment of the novel compressed air control apparatus including a common solenoid valve for the two brake circuits and for regeneration.

Referring now in greater detail to the drawings, FIG. 1 illustrates the novel compressed air control apparatus. The compressed air control apparatus includes a common housing 1 in which a pressure controller 2, a multi circuit protection valve 3 and an air dryer 4 are arranged. The air dryer 4 serves to remove humidity from the compressed air being delivered by a compressor (not illustrated). The housing 1 and the pressure controller 2, respectively, includes an inlet connection 5 being connected to a conduit 6 coming from a compressor delivering compressed air. The inlet connection 5 is located next to a passage chamber 7 to which a controlled outlet valve 8 is connected. The outlet valve 8 leads to an outlet 9 being connected to the atmosphere. The controlled outlet valve 8 includes a valve body 10 cooperating with a rim 11 of the housing 1 and being supported on a spring 12. A piston 13 including a tappet 14 is associated with the valve body 10. A conduit 16 leads to a pressure chamber 15 at the piston 13. A solenoid valve 17 is arranged in the conduit 16. The solenoid valve 17 is designed as a 3/2 way valve.

The passage chamber 7 in the region of the dryer 4 is connected to a granulate chamber 18 through which compressed air streams in the direction of arrow 19 in the idle phase of the apparatus. A check valve 20 is located at the end of the passage chamber 7 and of the granulate chamber 18, respectively. The check valve 20 is associated with the pressure controller 2, and it is located at the end of the pressure controller 2, respectively. The check valve 20 is designed as a usual check valve including a valve body being supported on a comparatively weak spring. The check valve 20 is connected to a stream chamber 21. The stream chamber 21 may also be designated as "central aerating system", and it is a functional part of the multi circuit protection valve 3. The conduit 16 leading to the solenoid valve 17 of the actuation unit of the controlled outlet valve 8 of the pressure controller 2 is connected to the stream chamber 21.

A connecting conduit 22 leads to each of the circuits I, II, III, IV and V. The connecting conduit 22 comes from the stream chamber 21. An overflow valve 23 having limited backflow is arranged in each one of the connecting conduits 22 of the circuits. Limited backflow is to be understood as the overflow valve being designed and arranged in a way that its opening pressure is greater than its closing pressure. The overflow valve 23 includes a step piston 24 being designed and arranged to be slidingly and sealingly supported in the housing 1. The step piston 24 is supported on a spring 25 the force of which is designed to be adjustable. The step piston 24 includes a first annular effective surface 26 being permanently connected to the connecting conduit 22. The size of the effective surface 26 in combination with the force of the spring 25 determines the opening pressure of the overflow valve 23. A second effective surface 27 is located at the same side of the step piston 24. In this way, a passage valve is formed with the rim 28. A conduit 29 leads to a reservoir container 30 of the respective circuit. The step piston 24 includes a third effective surface 31. In the illustrated exemplary embodiment of FIG. 1, the third effective surface 31 is located at the same side as the other effective surfaces 26 and 27 to face the upstream side.

A common solenoid valve 32 is associated with the two overflow valves 23 of the two brake circuits I and II. The common solenoid valve 32 is designed as a 3/2 way valve. The solenoid valve 32 is designed to be closed in its currentless condition, as this is illustrated in FIG. 1. The solenoid valve 32 is connected to the stream chamber 21 by a conduit 33. In the currentless condition, the solenoid valve 32 locks the entrance to the stream chamber 21. The solenoid valve 32 includes its own deaerating by a deaerating conduit 34 leading to the atmosphere. A common control conduit 35 leads from the solenoid valve 32 to the respective effective surface 31 being located at the two overflow valves 23 of the brake circuits I and II. In this way, it is imaginable that the step pistons 24 of the two overflow valves 23 are impinged with compressed air at their third effective surface 31 in the excited condition of the common solenoid valve 32. Thus, an additional opening force may be applied to the overflow valves 23 independent from the control signal. The additional force may be used to open the overflow valves 23.

A regeneration conduit 36 leads from the common solenoid valve 32 back into the region of the air dryer 4 without contacting the check valve 20. A check valve 37 is located in the regeneration conduit 36. The check valve 37 opens in the backflow direction. This means that compressed air may stream backwards through the dryer 4 in the regeneration phase. When the outlet valve 8 is opened, the compressed air streams into the atmosphere, and it regenerates the dryer 4. Due to the fact that such a regeneration phase is only realized in the idle phase of the compressor, meaning when the outlet valve 8 is opened, it is not necessary at this point in time to realize preferred filling of the brake circuits I and II. Accordingly, switching of the solenoid valve 32 does not have a negative effect on the overflow valves 23 during such a regeneration phase. On the other hand, the outlet valve 8 is closed in the load phase such that the signal coming from the solenoid valve 32 when switching the solenoid valve 32 cannot lead to a loss of pressure in the regeneration conduit 36. One makes use of the fact that the overflow valves 23 may be opened in this case to realize preferred filling of the brake circuits I and II. This may also be realized when the pressure is below a pressure which is considered normal. The circuit III may be associated with the brake of the trailer. The circuit IV serves to supply additional consumers. The circuit V may supply the air suspension system of the truck with compressed air.

Figure 2:
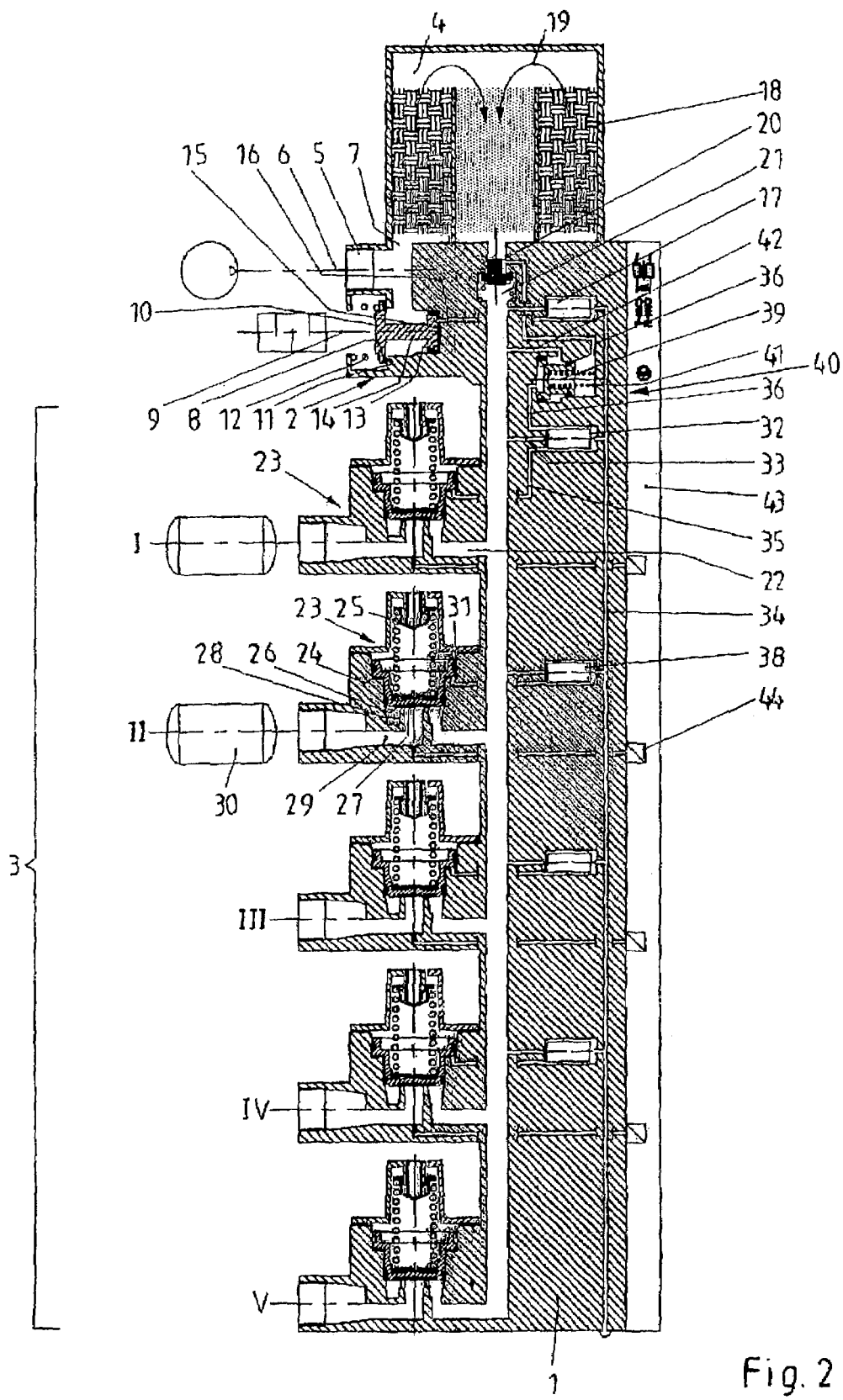
FIG. 2 is a longitudinal sectional view of another exemplary embodiment of the novel compressed air control apparatus including a solenoid valve allowing to control a brake circuit and the regeneration phase, a relay valve being located in the regeneration conduit.

The exemplary embodiment of the novel compressed air control apparatus illustrated in FIG. 2 has a lot in common with the embodiment of FIG. 1. Consequently, it is referred to the above description with respect to FIG. 1. In contrast to the embodiment of FIG. 1, the apparatus according to FIG. 2 includes a separate solenoid valve 38 being associated with the brake circuit II. The common solenoid valve 32 is only associated with the brake circuit I and the regeneration. A relay valve 39 is arranged in the regeneration conduit 36. The relay valve 39 replaces the check valve 37. The relay valve 39 includes a control piston 40 being supported on a spring 41. The force of the spring 41 may be designed to be adjustable. A minimum pressure is determined by the force of the spring 41 such that the relay valve 39 is activated after exceeding the minimum pressure. A conduit 42 leads from the stream chamber 21 to the relay valve 39. In the embodiment of the apparatus as illustrated in FIG. 2, the control conduit 35 leads to the third effective surface 31 of the overflow valve 23 of the brake circuit I. The common solenoid valve 32 is designed to be closed in its currentless condition. The effective surface 31 is located at the upstream side of the step piston 41 of the overflow valve 23 such that the overflow valve 23 is directly controlled when the solenoid valve 32 is being excited. A common electronic control unit 43 serves to control the solenoid valve 32, the solenoid valve 17, the solenoid valve 38 and other solenoid valves. A pressure tension converter 44 is associated with each circuit I, II, III and IV. The signal of the pressure tension converter 44 corresponds to the pressure prevailing in the respective circuit. The signal is transmitted to the electronic control unit 43 where appropriate processing takes place.

Figure 3:
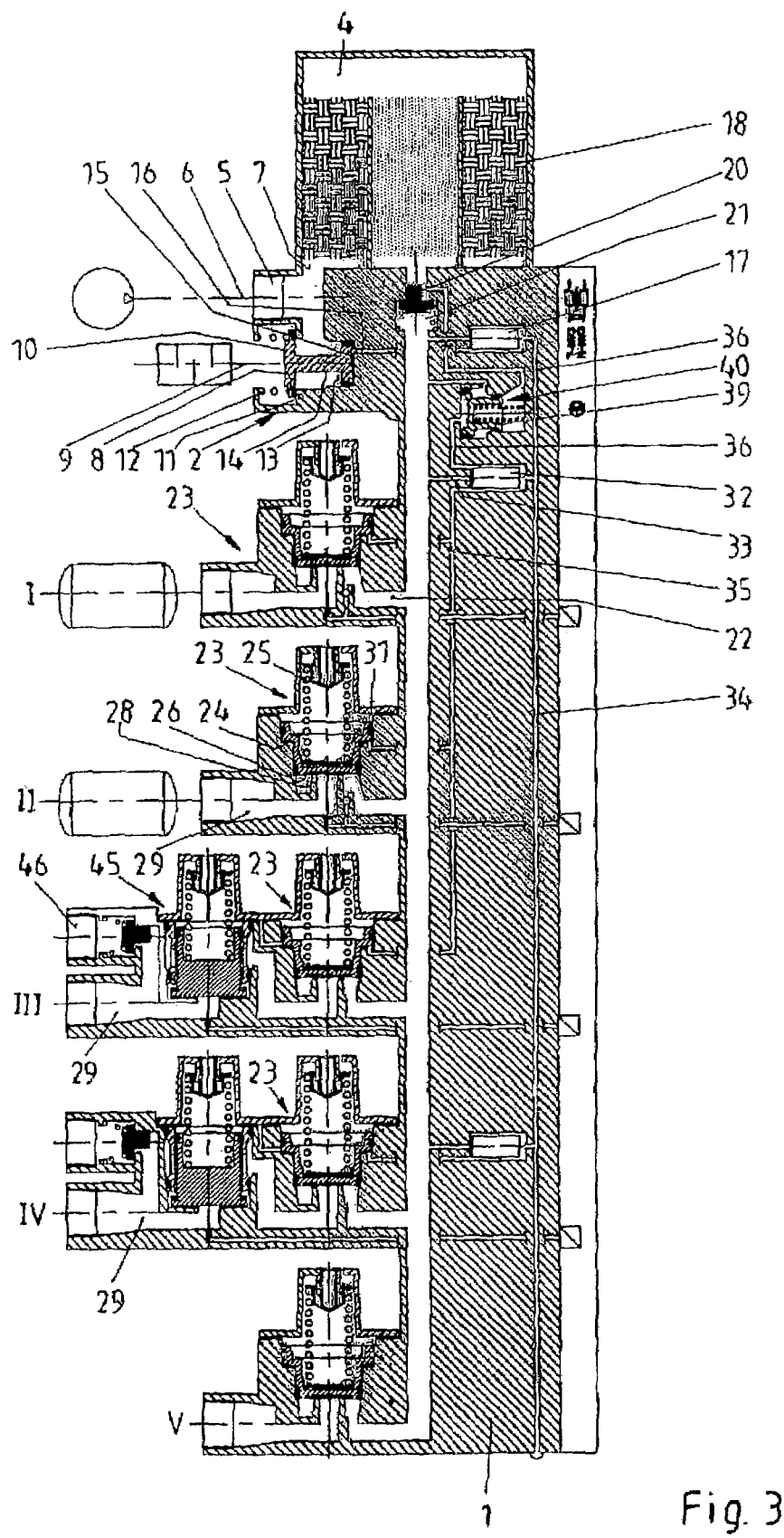
FIG. 3 is a longitudinal sectional view of another exemplary embodiment of the novel compressed air control apparatus including a solenoid valve serving to control the brake circuits I, II and III.

The exemplary embodiment of the novel apparatus as illustrated in FIG. 3 is similar to the embodiments of FIGS. 1 and 2. The compressed air control apparatus includes a common solenoid valve 32 serving to control the overflow valves 23 of the circuits I, II and III and to control a regeneration phase. The relay valve 39 is located in the regeneration conduit 36, this arrangement has already been described with respect to FIG. 2. A pressure limiting device 45 is located downstream of the overflow valve 23 of the brake circuit III. A connection 46 is arranged downstream of the pressure limiting device 45. A conduit (not illustrated) connects the connection 46 with a spring brake of the truck. A similar arrangement is realized at the brake circuit IV.

Figure 4:
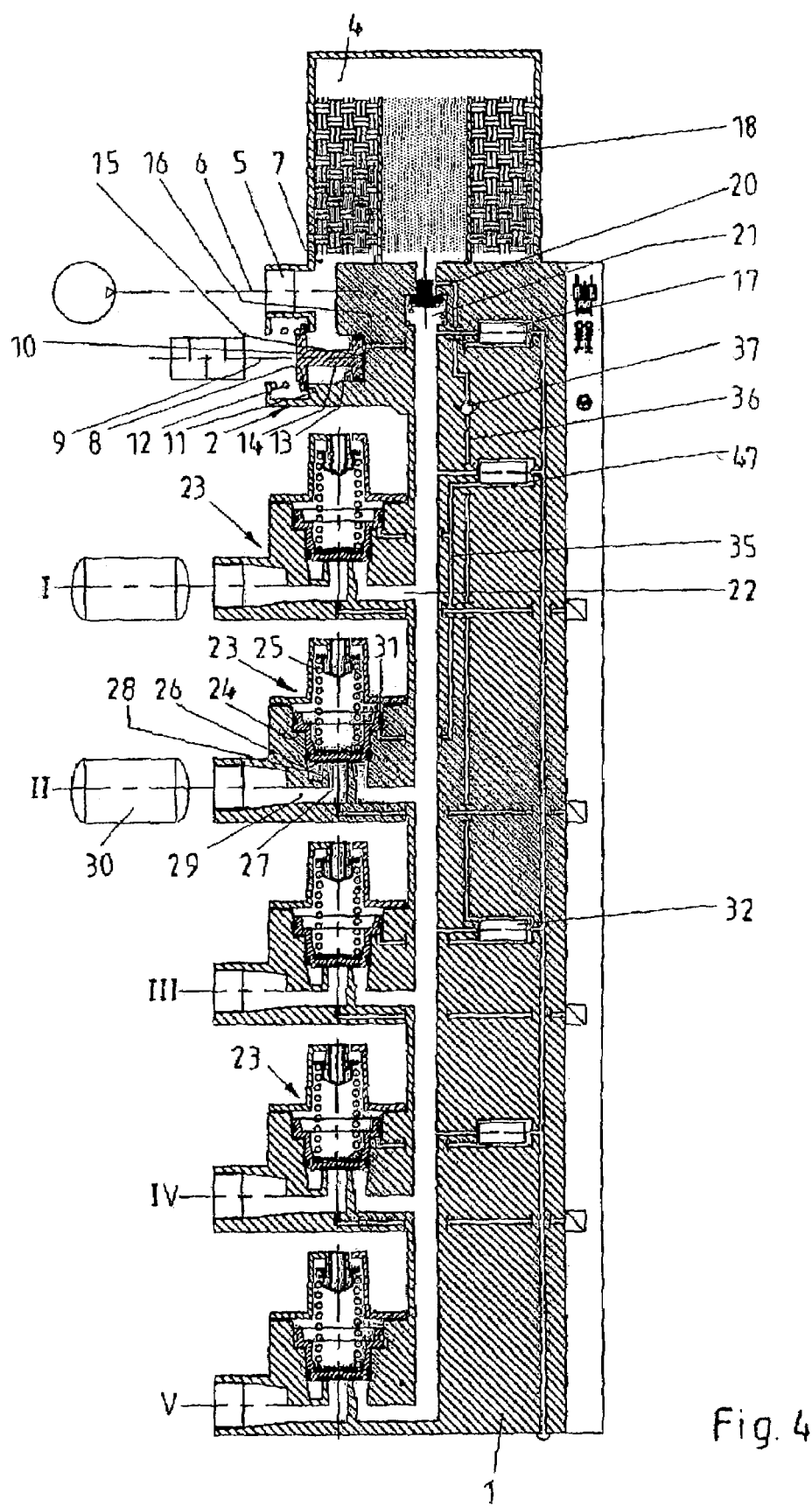
FIG. 4 is a view of another exemplary embodiment of the novel compressed air control apparatus including a solenoid valve serving to control the overflow valve of circuit III and regeneration.

With respect to the design of the regeneration conduit 36, the embodiment of the apparatus according to FIG. 4 is similar to the embodiment of the apparatus as illustrated in FIG. 1. In this case, the common solenoid valve 32 serves to control the overflow valve 23 of the circuit III and for regeneration. It is to be understood that there is another separate solenoid valve 47 serving to control the overflow valves 23 of the brake circuits I and II.

Figure 5:
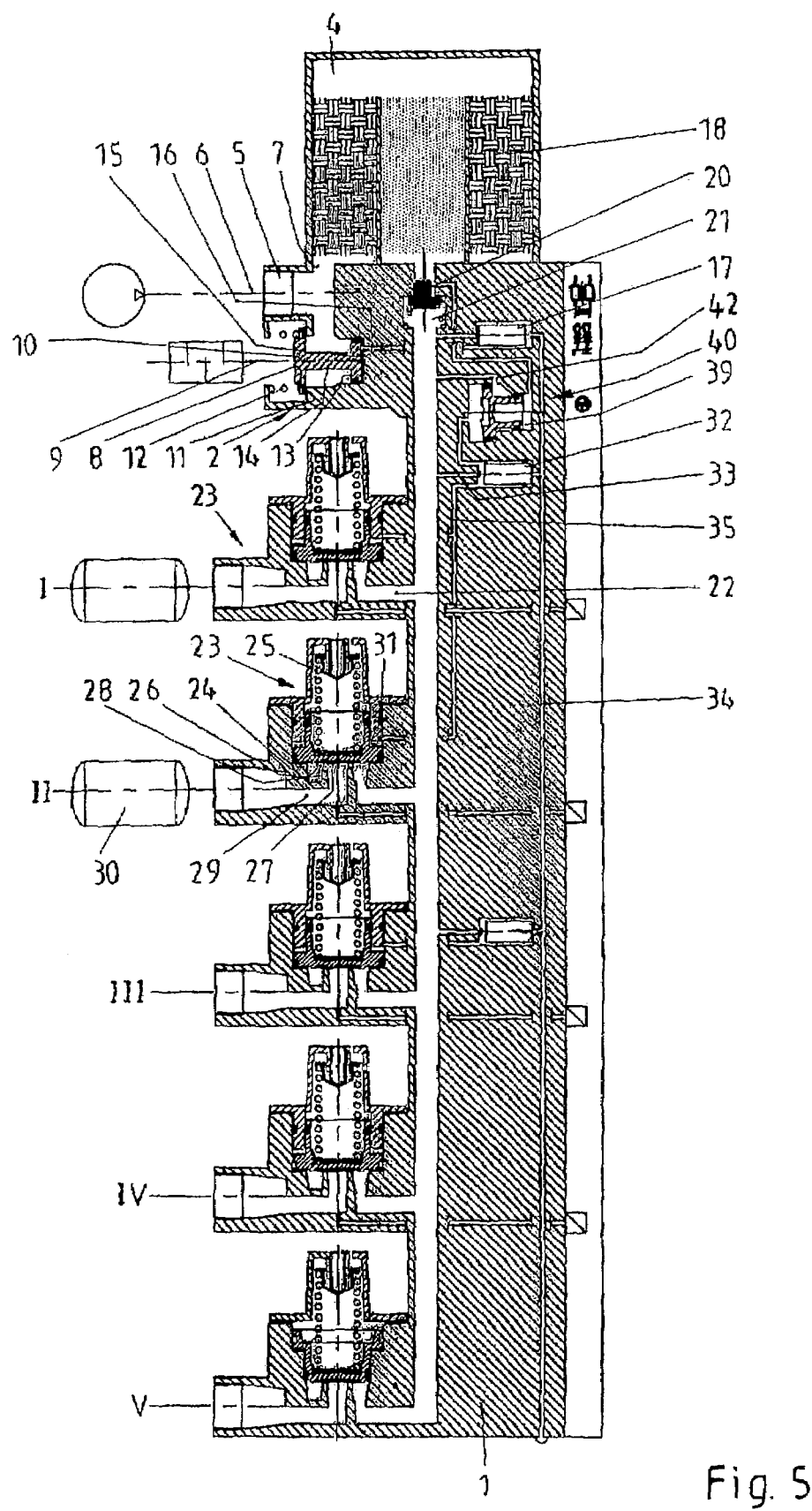
FIG. 5 is a view of another exemplary embodiment of the novel compressed air control apparatus including a solenoid valve serving to indirectly control the overflow valves of the brake circuits I and II and for regeneration.

The exemplary embodiment of the novel compressed air control apparatus according to FIG. 5 also includes the common solenoid valve 32. In this case, the solenoid valve 32 is designed to be opened in its currentless condition, as this is illustrated in FIG. 5. Thus, the solenoid valve 32 in the currentless, opened position connects the conduit 33 and the control conduit 35 with the overflow valves 23 of the circuits I and II. In this case, the third effective surface 31 is located at the downstream side of the step piston 24 of the overflow valve 23 such that the two overflow valves 23 are indirectly impinged with pressure. Deaerating the effective surface 31 when exciting the solenoid valve 32 results in the overflow valve 23 being opened. Regeneration is also realized by switching the solenoid valve 32. When the solenoid valve 32 is excited, the relay valve 39 is deaerated such that the conduit 42 will be connected with the part of the regeneration conduit 36 leading back to the air dryer 4 coming from the relay valve 39.

Many variations and modifications may be made to the preferred embodiments of the invention without departing substantially from the spirit and principles of the invention. All such modifications and variations are intended to be included herein within the scope of the present invention, as defined by the following claims.

I claim:

1. A compressed air control apparatus for compressed air systems of motor vehicles, comprising:
    a pressure controller being designed and arranged to control the pressure in said compressed air control apparatus, said pressure controller including an outlet valve;
    an air dryer being designed and arranged to dry the compressed air flowing through said compressed air control apparatus; and
    a multi circuit protection valve being designed and arranged to supply a plurality of circuits with compressed air, said multi circuit protection valve including:
        a plurality of overflow valves, each of said overflow valves being associated with one of said circuits,
        at least one solenoid valve being designed and arranged to arbitrarily operate said overflow valve and to control a regeneration phase of said air dryer in which water is removed from said air dryer, and
        a regeneration conduit being designed and arranged to connect said solenoid valve to said outlet valve of said pressure controller.

2. The compressed air control apparatus of claim 1, further comprising a check valve being arranged in said regeneration conduit and being designed and arranged to open in a regeneration direction, said solenoid valve being designed and arranged to directly control regeneration of said air dryer via said regeneration conduit.

3. The compressed air control apparatus of claim 1, further comprising a relay valve being arranged in said regeneration conduit, said solenoid valve being designed and arranged to indirectly control regeneration of said air dryer via said regeneration conduit.

4. The compressed air control apparatus of claim 2, wherein:
    each of said overflow valves includes a valve body, a flow chamber, a rear chamber, an effective surface and a spring being located in said rear chamber,
    said solenoid valve is designed and arranged to be closed in a currentless condition, and
    said effective surface of said overflow valve is arranged at an upstream side of said overflow valve.

5. The compressed air control apparatus of claim 3, wherein:
    each of said overflow valves includes a valve body, a flow chamber, a rear chamber, an effective surface and a spring being located in said rear chamber,
    said solenoid valve is designed and arranged to be closed in a currentless condition, and
    said effective surface of said overflow valve is arranged at an upstream side of said overflow valve.

6. The compressed air control apparatus of claim 2, wherein:
    each of said overflow valves includes a valve body, a flow chamber, a rear chamber, an effective surface and a spring being located in said rear chamber,
    said solenoid valve is designed and arranged to be opened in a currentless condition, and
    said effective surface of said overflow valve is arranged at a side of said overflow valve facing said rear chamber.

7. The compressed air control apparatus of claim 3, wherein:
    each of said overflow valves includes a valve body, a flow chamber, a rear chamber, an effective surface and a spring being located in said rear chamber,
    said solenoid valve is designed and arranged to be opened in a currentless condition, and
    said effective surface of said overflow valve is arranged at a side of said overflow valve facing said rear chamber.

8. The compressed air control apparatus of claim 1, wherein said plurality of circuits include circuit I and circuit II both being associated with a braking operation, said solenoid valve being designed and arranged to control said two overflow valves being associated with circuit I and circuit II and to control regeneration of said air dryer.

9. The compressed air control apparatus of claim 1, wherein said plurality of circuits include circuits I, II, III and IV, said solenoid valve being designed and arranged to control said overflow valve being associated with circuit III and said overflow valve being associated with circuit IV and to control regeneration of said air dryer.

10. The compressed air control apparatus of claim 1, wherein said plurality of circuits include circuits I, II, III and IV, said solenoid valve being designed and arranged to control said overflow valve being associated with circuit III and to control regeneration.

11. The compressed air control apparatus of claim 1, wherein said plurality of circuits include circuits I, II, III and IV, said solenoid valve being designed and arranged to control said overflow valve being associated with circuit IV and to control regeneration.

12. The compressed air control apparatus of claim 8, wherein:
- each of said overflow valves includes a valve body, a flow chamber, a rear chamber, an effective surface and a spring being located in said rear chamber,
- said effective surface is arranged at an upstream side of said overflow valve and is designed and arranged to be controlled by said solenoid valve, and
- a relay valve is arranged in said regeneration conduit.

13. The compressed air control apparatus of claim 9, wherein:
- each of said overflow valves includes a valve body, a flow chamber, a rear chamber, an effective surface and a spring being located in said rear chamber,
- said effective surface is arranged at an upstream side of said overflow valve and is designed and arranged to be controlled by said solenoid valve, and
- a relay valve is arranged in said regeneration conduit.

14. The compressed air control apparatus of claim 8, wherein:
- each of said overflow valves includes a valve body, a flow chamber, a rear chamber, an effective surface and a spring being located in said rear chamber,
- said effective surface is arranged at a downstream side of said overflow valve and is designed and arranged to be controlled by said solenoid valve, and
- a relay valve is arranged in said regeneration conduit.

15. The compressed air control apparatus of claim 9, wherein:
- each of said overflow valves includes a valve body, a flow chamber, a rear chamber, an effective surface and a spring being located in said rear chamber,
- said effective surface is arranged at a downstream side of said overflow valve and is designed and arranged to be controlled by said solenoid valve, and
- a relay valve is arranged in said regeneration conduit.

16. The compressed air control apparatus of claim 3, wherein said relay valve includes a control piston and a spring, said control piston being supported on said spring, said relay valve being designed and arranged to switch after having exceeded a minimum pressure being defined by said spring.

17. The compressed air control apparatus of claim 12, wherein said relay valve includes a control piston and a spring, said control piston being supported on said spring, said relay valve being designed and arranged to switch after having exceeded a minimum pressure being defined by said spring.

18. The compressed air control apparatus of claim 13, wherein said relay valve includes a control piston and a spring, said control piston being supported on said spring, said relay valve being designed and arranged to switch after having exceeded a minimum pressure being defined by said spring.

19. The compressed air control apparatus of claim 14, wherein said relay valve includes a control piston and a spring, said control piston being supported on said spring, said relay valve being designed and arranged to switch after having exceeded a minimum pressure being defined by said spring.

20. The compressed air control apparatus of claim 15, wherein said relay valve includes a control piston and a spring, said control piston being supported on said spring, said relay valve being designed and arranged to switch after having exceeded a minimum pressure being defined by said spring.

* * * * *